US012162487B2

(12) United States Patent
Sun

(10) Patent No.: US 12,162,487 B2
(45) Date of Patent: Dec. 10, 2024

(54) VEHICLE VELOCITY CONTROL METHOD AND DEVICE

(71) Applicant: NIO TECHNOLOGY (ANHUI) CO., LTD, Hefei (CN)

(72) Inventor: Sichen Sun, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 296 days.

(21) Appl. No.: 17/724,830

(22) Filed: Apr. 20, 2022

(65) Prior Publication Data

US 2022/0348203 A1 Nov. 3, 2022

(30) Foreign Application Priority Data

Apr. 29, 2021 (CN) .......................... 202110479128.0

(51) Int. Cl.
*B60W 10/00* (2006.01)
*B60W 30/16* (2020.01)
*B60W 40/04* (2006.01)

(52) U.S. Cl.
CPC ............ *B60W 30/16* (2013.01); *B60W 40/04* (2013.01); *B60W 2420/403* (2013.01); *B60W 2420/408* (2024.01); *B60W 2520/00* (2013.01)

(58) Field of Classification Search
CPC ................. B60W 30/16; B60W 40/04; B60W 2420/403; B60W 2420/408; B60W 2520/00; B60W 2520/10; B60W 2552/50; B60W 2554/402; B60W 2554/404; B60W 2554/4042; B60W 2554/801; B60W 2554/802; B60W 2720/10; B60W 30/143; B60W 40/00; B60W 50/00; B60W 10/00; B60K 2031/005

USPC .......................................................... 701/96
See application file for complete search history.

(56) References Cited

U.S. PATENT DOCUMENTS

| | | | |
|---|---|---|---|
| 2006/0217866 A1* | 9/2006 | Moebus ............ | B60K 31/0008 701/93 |
| 2014/0005908 A1 | 1/2014 | Kollberg et al. | |
| 2020/0122773 A1* | 4/2020 | Deshpande ............... | B60T 7/12 |
| 2021/0394791 A1* | 12/2021 | Zhu ................... | B60W 60/0016 |

FOREIGN PATENT DOCUMENTS

DE 102010056248 6/2012

OTHER PUBLICATIONS

Extended Search Report for European Patent Application No. 22165337.1, dated Oct. 6, 2022, 6 pages.

* cited by examiner

*Primary Examiner* — Shardul D Patel
(74) *Attorney, Agent, or Firm* — Sheridan Ross P.C.

(57) ABSTRACT

The disclosure relates to a vehicle velocity control method. The method includes: determining, by an onboard sensor, drivable distances in different directions in front of a current vehicle, and obtaining, at least based on types of targets in the different directions, an area of a drivable space in front of the current vehicle; determining, based on the area of the drivable space and a current vehicle velocity, a result of a safety degree in a current driving scenario; and controlling the vehicle velocity of the current vehicle based on the result of the safety degree. The disclosure further relates to a vehicle control device, a computer storage medium, and a vehicle.

15 Claims, 6 Drawing Sheets

VEHICLE VELOCITY CONTROL METHOD AND DEVICE

CROSS-REFERENCE TO RELATED APPLICATION

This application claims the benefit of China Patent Application No. 202110479128.0 filed on Apr. 29, 2021, the entire contents of which are incorporated herein by reference in its entirety.

TECHNICAL FIELD

The disclosure relates to the field of vehicle control, and in particular, to a vehicle velocity control method and device, a computer storage medium, and a vehicle.

BACKGROUND ART

In the field of driver assistance, it is a significant development trend to make functional performance better fit actual driving habits of drivers to implement "human-like" driving. More "human-like" functional performance also facilitates driver's understanding of a driver assistance function of a vehicle, thereby mitigating feelings of insecurity and nervousness of the driver when the function is enabled.

In existing vehicle adaptive cruise control, velocity control is usually performed for a target in front of the present vehicle. Specifically, an existing function of vehicle adaptive cruise control mainly takes into consideration the target ahead on a traveling route of the present vehicle, and controls a velocity of the present vehicle while ensuring a safe distance between the present vehicle and a vehicle ahead. For leading vehicles respectively traveling in left, middle, and right lanes with a pattern of a triangle, the control logic may neglect the vehicles at the two sides that have entered a surrounding space, which intensifies a feeling of insecurity of a driver during driving and results in a declined trust in the function. Moreover, objects on a road that can "surround" the present vehicle are not limited to other vehicles, and also include static road structures such as road median strips and curbs. These targets together affect the determination of the driver as to whether a current driving environment is safe.

Therefore, an improved vehicle velocity control method and device are desired.

SUMMARY OF THE INVENTION

According to an aspect of the disclosure, there is provided a vehicle velocity control method, the method including: determining, by an onboard sensor, drivable distances in different directions in front of a current vehicle, and obtaining, at least based on types of targets in the different directions, an area of a drivable space in front of the current vehicle; determining, based on the area of the drivable space and a current vehicle velocity, a result of a safety degree in a current driving scenario; and controlling the vehicle velocity of the current vehicle based on the result of the safety degree.

As a supplement or an alternative to the above solution, in the above method, the determining, by an onboard sensor, drivable distances in different directions in front of a current vehicle, and obtaining, at least based on types of targets in the different directions, an area of a drivable space in front of the current vehicle include: determining, by the onboard sensor, the drivable distances in the different directions in front of the current vehicle; correcting the drivable distances at least based on the types of the targets in the different directions, to obtain a corrected drivable distance in each direction; and calculating, based on the corrected drivable distance in each direction, the area of the drivable space in front of the current vehicle.

As a supplement or an alternative to the above solution, in the above method, the determining, by the onboard sensor, the drivable distances in the different directions in front of the current vehicle includes: obtaining, by the onboard sensor, distances $R_i$ from the targets, heights $H_i$ of the targets, and the types $T_i$ of the targets in the different directions $\theta_i$ of the current vehicle; and converting the distances $R_i$ from the targets in the different directions $\theta_i$ into drivable distances $D_i$ in a same plane, where $D_i=\sqrt{R_i^2-H_i^2}$.

As a supplement or an alternative to the above solution, in the above method, the correcting the drivable distances at least based on the types of the targets in the different directions, to obtain a corrected drivable distance in each direction includes: when the drivable distance is less than a safe driving distance corresponding to the current vehicle velocity and a target in the direction is a static road structure or the target in the direction is another vehicle with a velocity much higher than the current vehicle velocity, correcting drivable distances $D_i$ to $D'_i$, where $D'_i=(1-k)\cdot D_i + k\cdot d_{thres}$, k is a correction proportion, and $d_{thres}$ is the safe driving distance corresponding to the current vehicle velocity.

As a supplement or an alternative to the above solution, in the above method, the correcting the drivable distances at least based on the types of the targets in the different directions, to obtain a corrected drivable distance in each direction includes: correcting the drivable distances of the vehicle based on a safe driving area, where the correction takes into consideration psychological feelings of a driver and a distance relative to a lane-changing vehicle.

As a supplement or an alternative to the above solution, in the above method, the calculating, based on the corrected drivable distance in each direction, the area of the drivable space in front of the current vehicle includes: calculating the area A of the drivable space in front of the current vehicle according to the following formula: $A=\Sigma_{i=1}^{N-1} \frac{1}{2} D'_{i-1} D'_i \sin \Delta\theta_i$, where N represents a number of measurable directions, and $\Delta\theta_i$ represents an angle difference between directions $\theta_i$ and $\theta_{i-1}$.

As a supplement or an alternative to the above solution, in the above method, the determining, based on the area of the drivable space and a current vehicle velocity, a result of a safety degree in a current driving scenario includes: comparing the area of the drivable space with area thresholds of drivable spaces of different safety levels that correspond to the current vehicle velocity, to determine the result of the safety degree in the current driving scenario.

As a supplement or an alternative to the above solution, in the above method, the controlling the vehicle velocity of the current vehicle based on the result of the safety degree includes: outputting a recommended velocity for current vehicle driving based on the result of the safety degree and in combination with the current vehicle velocity.

As a supplement or an alternative to the above solution, in the above method, a recommended velocity lower than the current vehicle velocity is output when the result of the safety degree indicates a lower driving safety.

According to another aspect of the disclosure, there is provided a vehicle velocity control device, the device including: a first determination apparatus configured to:

determine, by an onboard sensor, drivable distances in different directions in front of a current vehicle, and obtain, at least based on types of targets in the different directions, an area of a drivable space in front of the current vehicle; a second determination apparatus configured to determine, based on the area of the drivable space and a current vehicle velocity, a result of a safety degree in a current driving scenario; and a control apparatus configured to control the vehicle velocity of the current vehicle based on the result of the safety degree.

As a supplement or an alternative to the above solution, in the above device, the first determination apparatus includes: a determination unit configured to determine, by the onboard sensor, the drivable distances in the different directions in front of the current vehicle; a correction unit configured to correct the drivable distances at least based on the types of the targets in the different directions, to obtain a corrected drivable distance in each direction; and a calculation unit configured to calculate, based on the corrected drivable distance in each direction, the area of the drivable space in front of the current vehicle.

As a supplement or an alternative to the above solution, in the above device, the determination unit is configured to: obtain, by the onboard sensor, distances $R_i$ from the targets, heights $H_i$ of the targets, and the types $T_i$ of the targets in the different directions $\theta_i$ of the current vehicle; and convert the distances $R_i$ from the targets in the different directions $\theta_i$ into drivable distances $D_i$ in a same plane, where $D_i=\sqrt{R_i^2-H_i^2}$.

As a supplement or an alternative to the above solution, in the above device, the correction unit is configured to: when the drivable distance is less than a safe driving distance corresponding to the current vehicle velocity and a target in the direction is a static road structure or the target in the direction is another vehicle with a velocity much higher than the current vehicle velocity, correct drivable distances $D_i$ to $D'_i$, where $D'_i=(1-k)\cdot D_i+k\cdot d_{thres}$, k is a correction proportion, and $d_{thres}$ is the safe driving distance corresponding to the current vehicle velocity.

As a supplement or an alternative to the above solution, in the above device, the correction unit is configured to correct the drivable distances of the vehicle based on a safe driving area, where the correction takes into consideration psychological feelings of a driver and a distance relative to a lane-changing vehicle.

As a supplement or an alternative to the above solution, in the above device, the calculation unit is configured to: calculate the area A of the drivable space in front of the current vehicle according to the following formula: $A=\Sigma_{i=1}^{N-1} \frac{1}{2} D'_{i-1} D'_i \sin \Delta\theta_i$, where N represents a number of measurable directions, and $\Delta\theta_1$ represents an angle difference between directions $\theta_i$ and $\theta_{i-1}$.

As a supplement or an alternative to the above solution, in the above device, the second determination apparatus is configured to: compare the area of the drivable space with area thresholds of drivable spaces of different safety levels that correspond to the current vehicle velocity, to determine the result of the safety degree in the current driving scenario.

As a supplement or an alternative to the above solution, in the above device, the control apparatus is configured to: output a recommended velocity for current vehicle driving based on the result of the safety degree and in combination with the current vehicle velocity.

As a supplement or an alternative to the above solution, in the above device, the control apparatus is configured to output a recommended velocity lower than the current vehicle velocity when the result of the safety degree indicates a lower driving safety.

According to still another aspect of the disclosure, there is provided a computer storage medium, including instructions, where when the instructions are run, the method as described above is performed.

According to yet another aspect of the disclosure, there is provided a vehicle, including the device as described above.

In the vehicle velocity control solutions in the embodiments of the disclosure, the area of the drivable space in front of the present vehicle is determined, the result of the safety degree of a current vehicle driving environment is assessed, and a recommendation and control are made to the present vehicle in terms of velocity based on an assessment result, such that the present vehicle will not drive into or will take the initiative to drive away from a narrow driving area after adjustments made in advance based on a recommended velocity, thereby strengthening the security of a driver during driving and ameliorating the problem that a vehicle enters a narrow driving space in a multi-vehicle scenario.

BRIEF DESCRIPTION OF THE DRAWINGS

The above and other objectives and advantages of the disclosure will be more thorough and clearer from the following detailed description in conjunction with the drawings, where the same or similar elements are represented by the same reference numerals.

DETAILED DESCRIPTION OF EMBODIMENTS

To make the objectives, technical solutions, and advantages of the disclosure clearer, specific embodiments of the disclosure will be described in further detail below with reference to the accompanying drawings. It can be understood that the specific embodiments described herein are used merely to explain the disclosure, rather than limit the disclosure.

In addition, it should also be noted that, for ease of description, the accompanying drawings show only parts related to the disclosure rather than all content of the disclosure. Before discussing exemplary embodiments in more detail, it should be noted that some exemplary embodiments are described as processes or methods that are depicted as flowcharts. Although the flowcharts describe various operations (or steps) as sequential processing, many of the operations may be implemented in parallel, concurrently, or simultaneously. In addition, the sequence of the operations may be rearranged. The processing may be terminated when its operations are completed, but it may also have additional steps not included in the accompanying drawings. The processing may correspond to methods, functions, procedures, subroutines, subprograms, and so on.

Although exemplary embodiments are described as using a plurality of units to perform exemplary processes, it should be understood that these exemplary processes may also be performed by one or more modules.

Moreover, control logic of the disclosure may be included on a computer-readable medium as executable program instructions, which are implemented by a processor or the like. Instances of the computer-readable medium include, but are not limited to, a ROM, a RAM, an optical disc, a magnetic tape, a floppy disk, a flash drive, a smart card, and an optical data storage apparatus. A computer-readable recording medium may also be distributed in a computer system connected to a network, so that the computer-readable medium is stored and implemented in a distributed manner, for example, through a vehicle telematics service or a controller area network (CAN).

It should be understood that the term "vehicle" or other similar terms used herein includes general motor vehicles, such as passenger vehicles (including sport utility vehicles, buses, trucks, etc.) and various commercial vehicles, and includes hybrid vehicles, electric vehicles, etc. A hybrid vehicle is a vehicle with two or more power sources, such as a vehicle powered by a gasoline engine and an electric motor.

Vehicle velocity control solutions according to various exemplary embodiments of the disclosure will be described below in detail with reference to the accompanying drawings.

Figure 1:
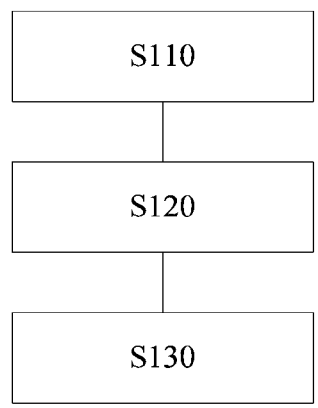
FIG. 1 is a schematic flowchart of a vehicle velocity control method according to an embodiment of the disclosure.

FIG. 1 is a schematic flowchart of a vehicle velocity control method 1000 according to an embodiment of the disclosure. As shown in FIG. 1, the vehicle velocity control method 1000 includes the following steps:

step S110 of determining, by an onboard sensor, drivable distances in different directions in front of a current vehicle, and obtaining, at least based on types of targets in the different directions, an area of a drivable space in front of the current vehicle;

step S120 of determining, based on the area of the drivable space and a current vehicle velocity, a result of a safety degree in a current driving scenario; and step S130 of controlling the vehicle velocity of the current vehicle based on the result of the safety degree.

The term "onboard sensor", also referred to as automobile sensor or a vehicle sensor, is an important component device for smart driving, which is the key to perception of an external environment by a vehicle. In an embodiment, the onboard sensor may be a camera, a millimeter wave radar, or a laser radar.

Figure 4:
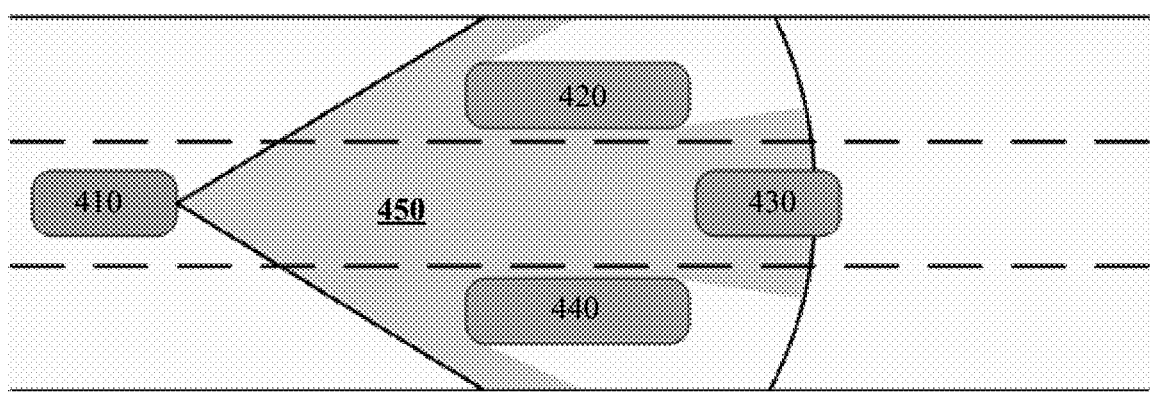
FIG. 4 is a schematic diagram of a drivable space of a vehicle according to an embodiment of the disclosure.

The term "drivable distance" refers to a distance between a present vehicle and a vehicle ahead or an obstacle ahead in a direction in front of the present vehicle. The "area of the drivable space" refers to an area of a free space, in a traveling direction, of the present vehicle. In this application, FIG. 4 is a schematic diagram of a drivable space of a vehicle according to an embodiment of the disclosure. As shown in FIG. 4, a present vehicle is shown as 410, and other vehicles 420, 430, and 440 move ahead of the present vehicle 410, where the vehicle 420 travels in a lane on the left of the present vehicle 410, the vehicle 430 and the present vehicle 410 travel in a same plane, and the vehicle 440 travels in a lane on the right of the present vehicle 410. In FIG. 4, a drivable space within a recognition range of the sensor of the present vehicle ("drivable space" for short) is shown at 450. An area of the space 450 (that is, an area of a gray space denoted by 450) is the area of the drivable space.

"Type of target" refers to a type of a target object in front of the present vehicle (sensor). For example, the target object may be other vehicles, or may be static road structures such as a median strip or a curb. Therefore, in one or more embodiments of the disclosure, the area of the drivable space in front of the current vehicle may be obtained in different manners depending on different types of target objects in different directions.

The term "result of safety degree in current driving scenario" refers to an assessment result for a safety degree of a driving environment of the current vehicle as far as a driver is concerned, such that a recommendation or control may be made to the present vehicle in terms of velocity based on the assessment result. In this way, a declined trust of the driver in functions caused due to the vehicle entering a narrow driving space is prevented.

The vehicle velocity control method 1000 is a method in which the area of the drivable space in front of the present vehicle is calculated, a safety degree of a current driving environment as far as a driver is concerned is assessed, and a recommended current traveling velocity of the present vehicle is provided based on an assessment result, such that an increased psychological burden on the driver caused due to the vehicle driving into a narrow driving space in some scenarios is prevented.

In an embodiment, step S110 includes: determining, by the onboard sensor, the drivable distances in the different directions in front of the current vehicle; correcting the drivable distances at least based on the types of the targets in the different directions, to obtain a corrected drivable distance in each direction; and calculating, based on the corrected drivable distance in each direction, the area of the drivable space in front of the current vehicle.

Specifically, the determining, by the onboard sensor, the drivable distances in the different directions in front of the current vehicle may include: obtaining, by the onboard sensor (for example, a camera, a millimeter wave radar, or a laser radar), distances $R_i$ from the targets, heights $H_i$ of the targets, and the types $T_i$ of the targets in the different directions $\theta_i$ of the current vehicle; and converting, by using a trigonometry formula, the distances $R_i$ from the targets in the different directions $\theta_i$ into drivable distances $D_i$, in a same plane, of the vehicle, where $D_i = \sqrt{R_i^2 - H_i^2}$.

In an embodiment, the correcting the drivable distances at least based on the types of the targets in the different directions, to obtain a corrected drivable distance in each direction includes: when the drivable distance is less than the safe driving distance corresponding to the current vehicle velocity and a target in the direction is a static road structure, such as a median strip or a curb, instead of another vehicle, since a road structure causes a much lower sense of insecurity to the driver than a vehicle, correcting a driving distance to a safe driving distance in a certain proportion, where a correction proportion k is an empirical value. The corrected drivable distance is $D'_i = (1-k) \cdot D_i + k \cdot d_{thres}$, k is the correction proportion, and $d_{thres}$ is the safe driving distance corresponding to the current vehicle velocity.

In another embodiment, the correcting the drivable distances at least based on the types of the targets in the different directions, to obtain a corrected drivable distance in each direction includes: when the drivable distance is less than the safe driving distance corresponding to the current vehicle velocity and a target in the direction is another vehicle with a velocity much higher than a traveling velocity of the present vehicle at a current moment (that is, the current vehicle velocity), since it is believed that the target vehicle will be far away from the present vehicle soon and the scenario will come back into a safe range soon, correcting a driving distance to a safe driving distance in a certain proportion, where a correction proportion k is an empirical value. The corrected drivable distance is $D'_i=(1-k)\cdot D_i + k\cdot d_{thres}$, k is the correction proportion, and $d_{thres}$ is the safe driving distance corresponding to the current vehicle velocity.

In an embodiment, the calculating, based on the corrected drivable distance in each direction, the area of the drivable space in front of the current vehicle includes: calculating the area A of the drivable space in front of the current vehicle according to the following formula: $A=\Sigma_{i=1}^{N-1} \frac{1}{2} D'_{i-1} D'_i \sin \Delta\theta_i$, where N represents a number of measurable directions, and $\Delta\theta_1$ represents an angle difference between directions $\theta_i$ and $\theta_{i-1}$. Particularly, if measurement of a drivable distance in a direction $\theta_i$ has a low confidence level or is invalid, a corrected result for a drivable distance in another direction (for example, adjacent directions $\theta_{i-1}$ and $\theta_{i+1}$) may be used instead to calculate an approximation of an area of triangle, and in this case, $\Delta\theta_1$ is correspondingly modified to an angle difference in the corresponding directions.

In an embodiment, step S120 includes: comparing the area of the drivable space with area thresholds $A_{thres}$ of drivable spaces of different safety levels that correspond to the current vehicle velocity, to determine the result of the safety degree in the current driving scenario.

In an embodiment, the "area thresholds $A_{thres}$ of drivable spaces of different safety levels" and the "safe driving distance $d_{thres}$" may be obtained by:

first compiling statistics on areas Area(v) of distribution of drivable spaces in front of a vehicle during the process of a human driver driving at different vehicle velocities v; then, determining, for a specific velocity range $[v_{min}, v_{max}]$, top K % of the areas of distribution of drivable spaces within the range as areas for driving in the different safety levels, thereby obtaining the area thresholds $A_{thres}$ of the drivable spaces of the different safety levels within the velocity range; and at last, converting, by using an assumption of an area of a sector, the safe driving area thresholds $A_{thres}$ into the safe driving distances $d_{thres}$:

$$d_{thres} = \sqrt{\frac{2A_{thres}}{\theta}},$$

where θ is a maximum measurable angle range of the drivable space.

In an embodiment, step S130 includes: outputting a recommended velocity for current vehicle driving based on the result of the safety degree and in combination with the current vehicle velocity. When a smaller area of a drivable space of a vehicle results in a reduced driving safety, a recommended vehicle velocity lower than the current vehicle velocity of the present vehicle is output based on a safety level. The vehicle can slow down before entering the narrow space by using the recommendation value together with a vehicle controller.

In addition, those skilled in the art readily understand that the vehicle velocity control method provided in the one or more embodiments of the disclosure can be implemented by using a computer program. For example, when a computer storage medium (for example, a USB flash drive) storing the computer program is connected to a computer, the vehicle velocity control method in one or more embodiments of the disclosure can be performed by running the computer program.

Figure 2:
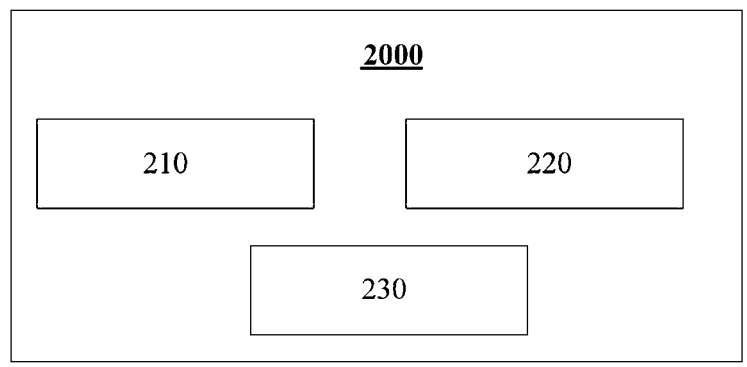
FIG. 2 is a schematic structural diagram of a vehicle velocity control device according to an embodiment of the disclosure.

Referring to FIG. 2, FIG. 2 is a schematic structural diagram of a vehicle velocity control device 2000 according to an embodiment of the disclosure. As shown in FIG. 2, the vehicle velocity control device 2000 includes: a first determination apparatus 210, a second determination apparatus 220, and a control apparatus 230. The first determination apparatus 210 is configured to: determine, by an onboard sensor, drivable distances in different directions in front of a current vehicle, and obtain, at least based on types of targets in the different directions, an area of a drivable space in front of the current vehicle; the second determination apparatus 220 is configured to determine, based on the area of the drivable space and a current vehicle velocity, a result of a safety degree in a current driving scenario; and the control apparatus 230 is configured to control the vehicle velocity of the current vehicle based on the result of the safety degree.

The term "onboard sensor", also referred to as automobile sensor or a vehicle sensor, is an important component device for smart driving, which is the key to perception of an external environment by a vehicle. In an embodiment, the onboard sensor may be a camera, a millimeter wave radar, or a laser radar.

The term "drivable distance" refers to a distance between a present vehicle and a vehicle ahead or an obstacle ahead in a direction in front of the present vehicle. The "area of the drivable space" refers to an area of a free space, in a traveling direction, of the present vehicle. "Type of target" refers to a type of a target object in front of the present vehicle (sensor). For example, the target object may be other vehicles, or may be static road structures such as a median strip or a curb. Therefore, in one or more embodiments of the disclosure, the area of the drivable space in front of the current vehicle may be obtained in different manners depending on different types of target objects in different directions.

The term "result of safety degree in current driving scenario" refers to an assessment result for a safety degree of a driving environment of the current vehicle as far as a driver is concerned, such that a recommendation or control may be made to the present vehicle in terms of velocity based on the assessment result. In this way, a declined trust of the driver in functions caused due to the vehicle entering a narrow driving space is prevented.

In an embodiment, although not shown in FIG. 2, the first determination apparatus 210 includes: a determination unit configured to determine, by the onboard sensor, the drivable distances in the different directions in front of the current vehicle; a correction unit configured to correct the drivable distances at least based on the types of the targets in the different directions, to obtain a corrected drivable distance in each direction; and a calculation unit configured to calculate, based on the corrected drivable distance in each direction, the area of the drivable space in front of the current vehicle.

In an embodiment, the determination unit is configured to: obtain, by the onboard sensor, distances $R_i$ from the targets, heights $H_i$ of the targets, and the types $T_i$ of the targets in the different directions $\theta_i$ of the current vehicle; and convert the distances $R_i$ from the targets in the different directions $\theta_i$ into drivable distances $D_i$ in a same plane, where $D_i=\sqrt{R_i^2-H_i^2}$.

In an embodiment, the correction unit is configured to: when the drivable distance is less than a safe driving distance corresponding to the current vehicle velocity and a target in the direction is a static road structure or the target in the direction is another vehicle with a velocity much higher than the current vehicle traveling velocity of the current vehicle, correct drivable distances $D_i$ to $D'_i$, where $D'_i=(1-k)\cdot D_i+k\cdot d_{thres}$, k is a correction proportion, and $d_{thres}$ is the safe driving distance corresponding to the current vehicle velocity.

In an embodiment, the calculation unit is configured to: calculate the area A of the drivable space in front of the current vehicle according to the following formula: $A=\Sigma_{i=1}^{N-1} \frac{1}{2} D'_{i-1} D'_i \sin \Delta\theta_i$, where N represents a number of measurable directions, and $\Delta\theta_i$ represents an angle difference between directions $\theta_i$ and $\theta_{i-1}$.

Figure 5:
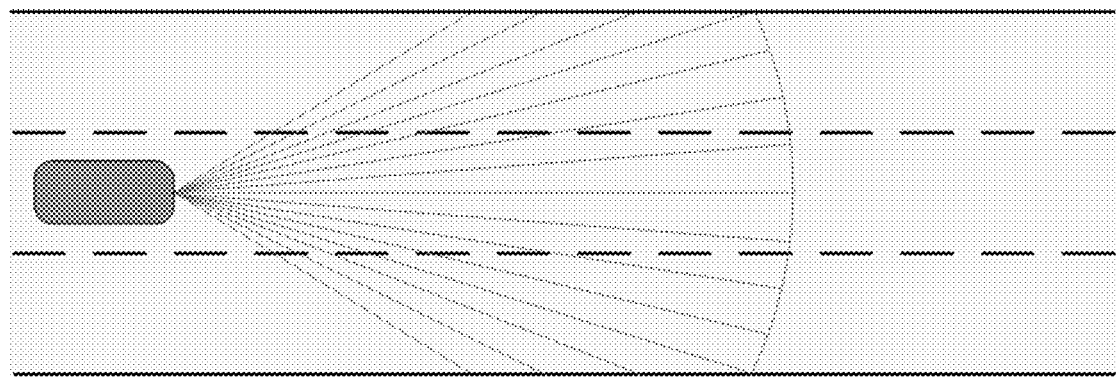
FIG. 5 is a schematic diagram of a method for discretization and approximation of an area of a drivable space according to an embodiment of the disclosure.
Figure 6:
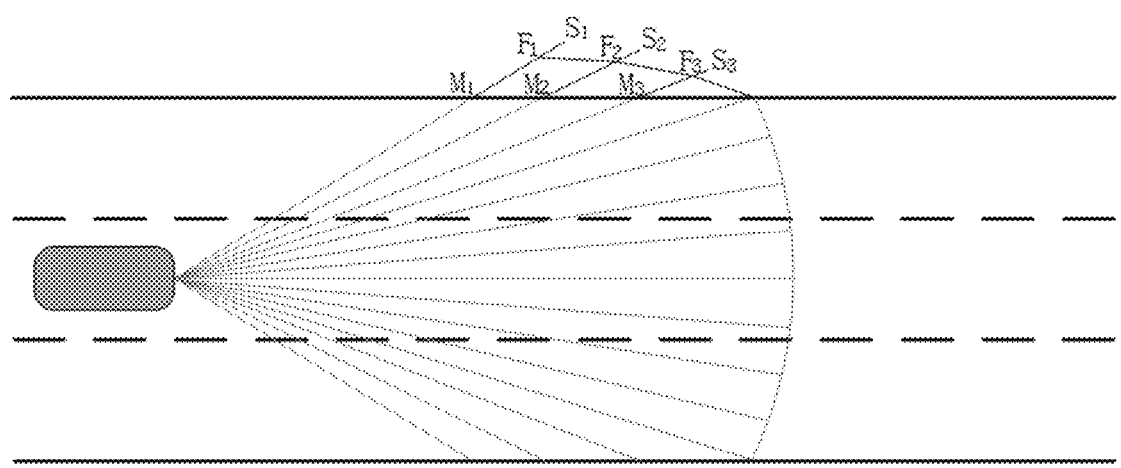
FIG. 6 is a schematic diagram of correction of a drivable distance in each direction according to an embodiment of the disclosure.

FIG. 5 illustrates a method for discretization of a whole drivable space by using a drivable distance in each direction and approximation of an area of each sector by using an area of a triangle after the discretization, when calculating an area of the drivable space. Straight lines starting from the current vehicle represent drivable distances in various directions that are measured by the onboard sensor, and a distant arc represents an ultimate measurement distance of the sensor in an open scenario. FIG. 6 illustrates correction of a drivable distance in each direction. $M_i$ represents a direct measurement value of the drivable distance in the direction, $S_i$ represents a safe distance corresponding to the current vehicle velocity, and $F_i$ represents a drivable distance corrected in proportion. In one or more embodiments of the disclosure, the drivable distances of the vehicle may be corrected based on a safe driving area, where the correction takes into consideration psychological feelings of a driver and a distance relative to a lane-changing vehicle.

In an embodiment, the second determination apparatus 220 is configured to: compare the area of the drivable space with area thresholds of drivable spaces of different safety levels that correspond to the current vehicle velocity, to determine the result of the safety degree in the current driving scenario.

For example, area thresholds of safe driving spaces of different vehicle velocities and a safe driving distance may be calculated by: first compiling statistics on areas Area(v) of distribution of drivable spaces in front of a vehicle during the process of a human driver driving at different vehicle velocities v; then, determining, for a specific velocity range $[v_{min}, v_{max}]$, top K % of the areas of distribution of drivable spaces within the range as areas for driving in the different safety levels, thereby obtaining the area thresholds $A_{thres}$ of the drivable spaces of the different safety levels within the velocity range; and at last, converting, by using an assumption of an area of a sector, the safe driving area thresholds $A_{thres}$ into the safe driving distances $d_{thres}$:

$$d_{thres} = \sqrt{\frac{2 A_{thres}}{\theta}},$$

where θ is a maximum measurable angle range of the drivable space.

In an embodiment, the control apparatus 230 is configured to: output a recommended velocity for current vehicle driving based on the result of the safety degree and in combination with the current vehicle velocity. For example, the control apparatus is configured to output a recommended velocity lower than the current vehicle velocity when the result of the safety degree indicates a lower driving safety.

Figure 3:
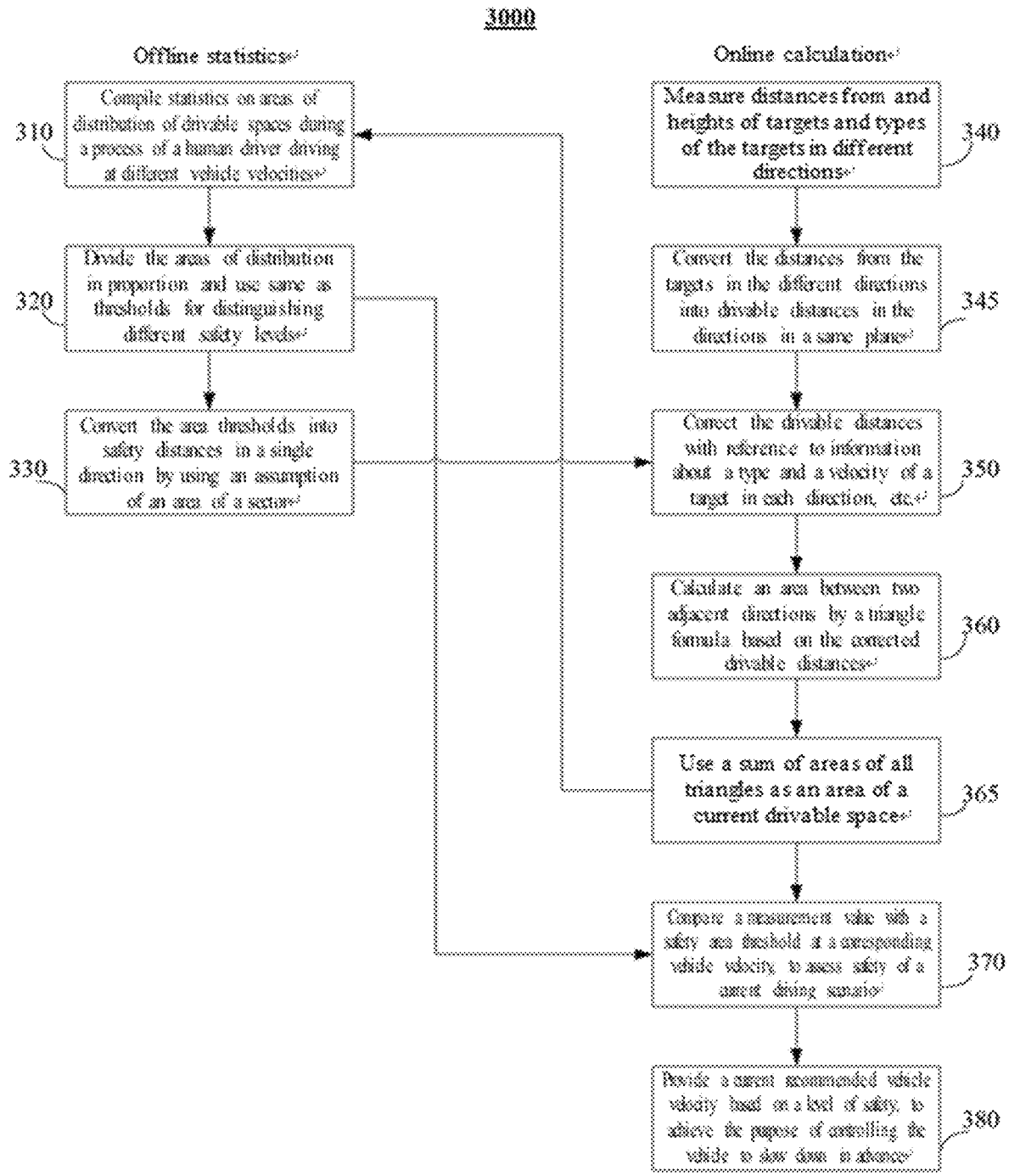
FIG. 3 is a flowchart of implementing assessment of safety of a driving scenario based on an area of a drivable space of a vehicle according to an embodiment of the disclosure.

FIG. 3 is a flowchart 3000 of implementing assessment of safety of a driving scenario based on an area of a drivable space of a vehicle according to an embodiment of the disclosure. As shown in FIG. 3, the flowchart 3000 may specifically include two parts: offline statistics and online calculation. In a flowchart of the offline statistics, statistics is first compiled on areas of distribution of drivable spaces during a process of a human driver driving at different vehicle velocities (step 310); then, the areas of distribution are divided in proportion (where for example, top K % are selected) and used as thresholds for distinguishing different safety levels (step 320); and at last, the area thresholds are converted into safety thresholds in a single direction by using an assumption of an area of a sector (step 330). In a flowchart of the online calculation, distances from and heights of targets and types of the targets in different directions are first measured (step 340); then, the distances from the targets in the different directions are converted into drivable distances in the directions in a same plane (step 345); and further, the drivable distances are corrected with reference to information about a type and a velocity of a target in each direction, etc. (step 350). It should be noted that, the safe (driving) distance in a single direction obtained in step 330 may be used for the correction of the drivable distances in step 350. For example, the drivable distances $D_i$ are corrected to where $D'_i=(1-k)\cdot D_i+k\cdot d_{thres}$, k is a correction proportion (an empirical value), and $d_{thres}$ is a safe driving distance corresponding to a current vehicle velocity. The online calculation further includes: calculating an area between two adjacent directions by a triangle formula based on the corrected drivable distances (step 360), and then using a sum of areas of all triangles as an area of a current drivable space (step 365). It should be noted that the area of the drivable space obtained in step 365 may be further be stored or provided to a related device, for further update of historical statistical value in step 310. In step 370 following step 365, a measurement value is compared with a safety area threshold at a corresponding vehicle velocity (where the "driving spaces of the different safety levels" at corresponding vehicle velocities are already obtained in step 320). At last, in step 380, a current recommended vehicle velocity is provided based on a level of safety, to achieve the purpose of controlling the vehicle to slow down in advance.

In conclusion, in the vehicle velocity control solutions in the embodiments of the disclosure, the area of the drivable space in front of the present vehicle is determined, the result of the safety degree of a current vehicle driving environment is assessed, and a recommendation and control are made to the present vehicle in terms of velocity based on an assessment result, such that the present vehicle will not drive into or will take the initiative to drive away from a narrow driving area after adjustments made in advance based on a recommended velocity, thereby strengthening the security of a driver during driving and ameliorating the problem that a vehicle enters a narrow driving space in a multi-vehicle scenario.

Although only some embodiments of the invention are described in the specification, it will be appreciated by those skilled in the art that the invention may be embodied in many other forms without departing from the essence and scope thereof. Accordingly, the presented examples and implementations are considered to be illustrative rather than restrictive, and the invention may encompass various modifications and replacements without departing from the spirit and scope of the invention that are defined by the appended claims.

What is claimed:

1. A vehicle velocity control method, comprising
  determining, by an onboard sensor of a current vehicle, drivable distances in different directions in front of the current vehicle, and obtaining, at least based on types of targets in the different directions, an area of a drivable space in front of the current vehicle;
  determining, based on the area of the drivable space and a current vehicle velocity, a result of a safety degree in a current driving scenario; and
  controlling the vehicle velocity of the current vehicle based on the result of the safety degree.

2. The method according to claim 1, wherein the determining, by an onboard sensor, drivable distances in different directions in front of the current vehicle, and obtaining, at least based on types of targets in the different directions, an area of a drivable space in front of the current vehicle comprise:
  determining, by the onboard sensor, the drivable distances in the different directions in front of the current vehicle;
  correcting the drivable distances at least based on the types of the targets in the different directions, to obtain a corrected drivable distance in each direction; and
  calculating, based on the corrected drivable distance in each direction, the area of the drivable space in front of the current vehicle.

3. The method according to claim 2, wherein the determining, by the onboard sensor, the drivable distances in the different directions in front of the current vehicle comprises:
  obtaining, by the onboard sensor, distances $R_i$ from the targets, heights $H_i$ of the targets, and the types $T_i$ of the targets in the different directions $\theta_i$ of the current vehicle; and
  converting the distances $R_i$ from the targets in the different directions $\theta_i$ into drivable distances $D_i$ in a same plane, where $D_i = \sqrt{R_i^2 - H_i^2}$.

4. The method according to claim 2, wherein the correcting the drivable distances at least based on the types of the targets in the different directions, to obtain a corrected drivable distance in each direction comprises:
  when the drivable distance is less than a safe driving distance corresponding to the current vehicle velocity and a target in the direction is a static road structure or the target in the direction is another vehicle with a velocity much higher than the current vehicle velocity, correcting drivable distances $D_i$ to $D'_i$, where $D'_i = (1-k) \cdot D_i + k \cdot d_{thres}$, k is a correction proportion, and $d_{thres}$ is the safe driving distance corresponding to the current vehicle velocity.

5. The method according to claim 4, wherein the calculating, based on the corrected drivable distance in each direction, the area of the drivable space in front of the current vehicle comprises:
  calculating the area A of the drivable space in front of the current vehicle according to the following formula:

$A = \Sigma_{i=1}^{N-1} \frac{1}{2} D'_{i-1} D'_i \sin \Delta\theta_i$, where N represents a number of measurable directions, and $\Delta\theta_i$ represents an angle difference between directions $\theta_i$ and $\theta_{i-1}$.

6. The method according to claim 1, wherein the determining, based on the area of the drivable space and a current vehicle velocity, a result of a safety degree in a current driving scenario comprises:
  comparing the area of the drivable space with area thresholds of drivable spaces of different safety levels that correspond to the current vehicle velocity, to determine the result of the safety degree in the current driving scenario.

7. The method according to claim 1, wherein the controlling the vehicle velocity of the current vehicle based on the result of the safety degree comprises:
  outputting a recommended velocity for current vehicle driving based on the result of the safety degree and in combination with the current vehicle velocity.

8. The method according to claim 7, wherein a recommended velocity lower than the current vehicle velocity is output when the result of the safety degree indicates a lower driving safety.

9. A vehicle velocity control device, comprising:
  a first determination apparatus configured to: determine, by an onboard sensor, drivable distances in different directions in front of a current vehicle, and obtain, at least based on types of targets in the different directions, an area of a drivable space in front of the current vehicle;
  a second determination apparatus configured to determine, based on the area of the drivable space and a current vehicle velocity, a result of a safety degree in a current driving scenario; and
  a control apparatus configured to control the vehicle velocity of the current vehicle based on the result of the safety degree.

10. The device according to claim 9, wherein the first determination apparatus comprises:
  a determination unit configured to determine, by the onboard sensor, the drivable distances in the different directions in front of the current vehicle;
  a correction unit configured to correct the drivable distances at least based on the types of the targets in the different directions, to obtain a corrected drivable distance in each direction; and
  a calculation unit configured to calculate, based on the corrected drivable distance in each direction, the area of the drivable space in front of the current vehicle.

11. The device according to claim 10, wherein the determination unit is configured to:
  obtain, by the onboard sensor, distances $R_i$ from the targets, heights $H_i$ of the targets, and the types $T_i$ of the targets in the different directions $\theta_i$ of the current vehicle; and
  convert the distances $R_i$ from the targets in the different directions $\theta_i$ into drivable distances $D_i$ in a same plane, where $D_i = \sqrt{R_i^2 - H_i^2}$.

12. The device according to claim 10, wherein the correction unit is configured to:
  when the drivable distance is less than a safe driving distance corresponding to the current vehicle velocity and a target in the direction is a static road structure or the target in the direction is another vehicle with a velocity much higher than the current vehicle velocity, correct drivable distances $D_i$ to $D'_i$,
  where $D'_i = (1-k) \cdot D_i + k \cdot d_{thres}$, k is a correction proportion, and $d_{thres}$ is the safe driving distance corresponding to the current vehicle velocity.

13. The device according to claim 9, wherein the second determination apparatus is configured to:
  compare the area of the drivable space with area thresholds of drivable spaces of different safety levels that correspond to the current vehicle velocity, to determine the result of the safety degree in the current driving scenario.

14. The device according to claim 9, wherein the control apparatus is configured to: output a recommended velocity for current vehicle driving based on the result of the safety degree and in combination with the current vehicle velocity.

15. A non-transitory computer storage medium, having instructions stored thereon, wherein when the instructions are run by a processor, causing the processor to perform the following steps:
   determining, by an onboard sensor of a current vehicle, drivable distances in different directions in front of the current vehicle, and obtaining, at least based on types of targets in the different directions, an area of a drivable space in front of the current vehicle;
   determining, based on the area of the drivable space and a current vehicle velocity, a result of a safety degree in a current driving scenario; and
   controlling the vehicle velocity of the current vehicle based on the result of the safety degree.

* * * * *